United States Patent
Inada (10) Patent No.: US 10,831,255 B2
(45) Date of Patent: Nov. 10, 2020

(54) SEQUENCE CONTROLLER AND ELECTRONIC DEVICE

(71) Applicant: ROHM CO., LTD., Kyoto (JP)

(72) Inventor: Hirofumi Inada, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 161 days.

(21) Appl. No.: 16/046,195

(22) Filed: Jul. 26, 2018

(65) Prior Publication Data

US 2019/0033954 A1 Jan. 31, 2019

(30) Foreign Application Priority Data

Jul. 28, 2017 (JP) .................................. 2017-146895

(51) Int. Cl.
*G06F 1/00* (2006.01)
*G06F 1/3287* (2019.01)
*G06F 1/28* (2006.01)
*G06F 1/3203* (2019.01)
*G06F 1/26* (2006.01)

(52) U.S. Cl.
CPC ............ *G06F 1/3287* (2013.01); *G06F 1/263* (2013.01); *G06F 1/28* (2013.01); *G06F 1/3203* (2013.01)

(58) Field of Classification Search
CPC ...... G06F 1/3287; G06F 1/263; G06F 1/3203; G06F 1/28
See application file for complete search history.

(56) References Cited

U.S. PATENT DOCUMENTS

| | | | |
|---|---|---|---|
| 2014/0312690 A1* | 10/2014 | Olson | G06F 1/24 307/29 |
| 2016/0077958 A1* | 3/2016 | Hsu | G11C 7/20 711/103 |
| 2017/0083068 A1* | 3/2017 | Kashyap | G06F 1/1632 |

FOREIGN PATENT DOCUMENTS

| JP | 2007079881 A | 3/2007 |
|---|---|---|
| JP | 2013089060 A | 5/2013 |

* cited by examiner

*Primary Examiner* — Xuxing Chen
(74) *Attorney, Agent, or Firm* — Cantor Colburn LLP (57) ABSTRACT

A sequence controller for controlling a sequence of booting and stopping a plurality of power supplies includes a processor and a non-programmable read only memory (ROM). A series of parameter records describing the sequence is stored in a programmable memory. Each of the parameter records is one of (i) a first record including a first parameter and a second parameter and associated with a first instruction for setting one of the plurality of power supplies corresponding to the first parameter to one state of an ON state and an OFF state corresponding to the second parameter and (ii) a second record including a third parameter and associated with a second instruction to wait for a time period corresponding to the third parameter.

10 Claims, 10 Drawing Sheets

FIG. 3A

| bit7 | bit6 | bit5 | bit4 | bit3 | bit2 | bit1 | bit0 | Instruction (meaning) |
|---|---|---|---|---|---|---|---|---|
| 0 | 0 | 0 | 0 | 0 | 0 | 0 | 0 | Wait 10μs |
| 0 | 0 | 0 | 0 | 0 | 0 | 0 | 1 | Wait 100μs |
| 0 | 0 | 0 | 0 | 0 | 0 | 1 | 0 | Wait 1ms |
| 0 | 0 | 0 | 0 | 0 | 0 | 1 | 1 | Wait 10ms |

INSTRUCTION: bit7–bit6 = INSTRUCTION, bit5–bit2 = Don't Care, bit1–bit0 = PRM3

FIG. 3B

| bit7 | bit6 | bit5 | bit4 | bit3 | bit2 | bit1 | bit0 | Instruction (meaning) |
|------|------|------|------|------|------|------|------|-----------------------|
| 1    | 0    | 0    | 0    | 0    | 0    | 0    | 1    | Set LDO1 ON           |
| 1    | 0    | 0    | 0    | 0    | 0    | 0    | 0    | Set LDO1 OFF          |
| 1    | 0    | 0    | 1    | 0    | 0    | 0    | 1    | Set LDO2 ON           |
| 1    | 0    | 0    | 1    | 0    | 0    | 0    | 0    | Set LDO2 OFF          |
| 1    | 0    | 1    | 0    | 0    | 0    | 0    | 1    | Set DCDC1 ON          |
| 1    | 0    | 1    | 0    | 0    | 0    | 0    | 0    | Set DCDC1 OFF         |
| 1    | 1    | 0    | 0    | 0    | 0    | 0    | 1    | Set DCDC2 ON          |
| 1    | 1    | 0    | 0    | 0    | 0    | 0    | 0    | Set DCDC2 OFF         |

INSTRUCTION: bit7 / PRM1: bit6–bit4 / PRM2: bit3–bit0

FIG. 4A

| bit2 | bit1 | bit0 | Meaning |
|---|---|---|---|
| 0 | 0 | 0 | 1μs |
| 0 | 0 | 1 | 20μs |
| 0 | 1 | 0 | 100μs |
| 0 | 1 | 1 | 500μs |
| 1 | 0 | 0 | 1ms |
| 1 | 0 | 1 | 20ms |
| 1 | 1 | 0 | 30ms |
| 1 | 1 | 1 | 100ms |

PRM3: bit0, bit1, bit2

| bit7 | bit6 | bit5 | bit4 | bit3 | Meaning |
|---|---|---|---|---|---|
| 0 | 0 | 0 | 0 | 0 | Wait |

INSTRUCTION: bit3, bit4, bit5, bit6, bit7

FIG. 4B

| bit1 | bit0 | Meaning |
|---|---|---|
|  |  |  |
|  |  |  |
|  |  |  |

| bit2 | Meaning |
|---|---|
| 0 | OFF |
| 1 | ON |

} PRM2

| bit7 | bit6 | bit5 | bit4 | bit3 | Meaning |
|---|---|---|---|---|---|
| 0 | 0 | 0 | 0 | 1 | Set VR1 |
| 0 | 0 | 0 | 1 | 0 | Set VR2 |
| 0 | 0 | 0 | 1 | 1 | Set VR3 |
| 0 | 0 | 1 | 0 | 0 | Set VR4 |
|  |  |  | ∶ |  |  |
| 1 | 1 | 1 | 1 | 0 |  |
| 1 | 1 | 1 | 1 | 1 |  |

} INSTRUCTION+PRM1

FIG. 5

| Address | bit7 | bit6 | bit5 | bit4 | bit3 | bit2 | bit1 | bit0 | Meaning |
|---|---|---|---|---|---|---|---|---|---|
| 0 | 1 | 0 | 0 | 0 | 0 | 0 | 0 | 1 | Set LDO1 ON |
| 1 | 0 | 0 | 0 | 0 | 0 | 0 | 0 | 0 | Wait 10μs |
| 2 | 1 | 0 | 0 | 1 | 0 | 0 | 0 | 1 | Set LDO2 ON |
| 3 | 0 | 0 | 0 | 0 | 0 | 0 | 0 | 0 | Wait 10μs |
| 4 | 0 | 0 | 1 | 0 | 0 | 0 | 0 | 0 | Wait 10μs |
| 5 | 1 | 0 | 0 | 0 | 0 | 0 | 0 | 1 | Set DCDC1 ON |

| address | |
|---|---|
| 0D1H | PRM_REC1_1 |
| 0D2H | PRM_REC1_2 |
| 0D3H | PRM_REC1_3 |
| 0D4H | PRM_REC1_4 |
| 0D5H | PRM_REC1_5 |
| 0D6H | PRM_REC2_1 |
| 0D7H | PRM_REC2_2 |
| 0D8H | PRM_REC2_3 |
| 0D9H | PRM_REC2_4 |
| 0DAH | PRM_REC3_1 |
| 0DBH | PRM_REC3_2 |
| 0DCH | PRM_REC3_3 |
| 0DDH | PRM_REC3_4 |

S1: 0D1H–0D5H
S2: 0D6H–0D9H
S3: 0DAH–0DDH

FIG. 8

| address | Contents | Example |
| --- | --- | --- |
| 0C0H | Store head address of parameter records | (0D1H) |
| 0C1H | Record length of transition S1 | (5) |
| 0C2H | Record length of transition S2 | (4) |
| 0C3H | Record length of transition S3 | (4) |
| 0C4H | Record length of transition S4 | |
| 0C5H | Record length of transition S5 | |
| ⋮ | ⋮ | |
| 0D0H | Record length of transition S16 | |

SEQUENCE CONTROLLER AND ELECTRONIC DEVICE

CROSS-REFERENCE TO RELATED APPLICATION(S)

The present application claims priority under 35 U.S.C. § 119 to Japanese Patent Application No. 2017-146895, filed on Jul. 28, 2017, the entire contents of which are incorporated herein by reference.

TECHNICAL FIELD

The present disclosure relates to a power management technique for managing and controlling a plurality of power supplies.

BACKGROUND

A mobile phone, a tablet terminal, a notebook-sized personal computer (PC), a desktop PC, and a game machine include a microprocessor such as a central processing unit (CPU) or a graphics processing unit (GPU) that performs operation processing.

An electronic device equipped with a microprocessor is subdivided into dozens of circuit blocks according to the miniaturization of a semiconductor manufacturing process, the increase in the number of peripheral circuits to be mounted and the requirement of low power consumption, and is configured to control a power supply voltage independently for each circuit block.

In such a device, a power management IC (PMIC) is used to control dozens of power supply systems corresponding to dozens of circuit blocks. The PMIC is required to reliably control ON/OFF of dozens of power supplies according to a predetermined sequence.

The PMIC is required to have the following properties.
(1) Robustness and Stability
The PMIC is required to have a structure that does not run out of control due to an external noise or the like.
(2) Safety
The PMIC is required to have a function of autonomously shutting down the power supply system without depending on other devices in the event of an abnormal state.
(3) Power Saving
Since the PMIC needs to operate even when the system is shut down, its power consumption is required to be as small as possible.

It was difficult to construct the PMIC that satisfies these specification requirements by using a general-purpose microcomputer. Therefore, conventionally, it was necessary to design a dedicated sequencer on a hardware-by-hardware basis so as to satisfy the required specifications for each electronic device.

Conventionally, when changes to the booting sequence of several power supplies was desired, drastic design changes to the hardware needed to be made. Therefore, there was also a problem in that the mask modification becomes necessary even with a slight change and the design period becomes longer.

SUMMARY

Some embodiments of the present disclosure provide a PMIC capable of flexibly dealing with various required specifications.

According to one embodiment of the present disclosure, there is provided a sequence controller for controlling a sequence of booting and stopping a plurality of power supplies. The sequence controller includes a processor; and a non-programmable read only memory (ROM). A series of parameter records describing the sequence is stored in a programmable memory. Each of the parameter records is one of a first record and a second record. The first record includes a first parameter and a second parameter and is associated with a first instruction for setting one of the plurality of power supplies corresponding to the first parameter to one state of an ON state and an OFF state corresponding to the second parameter. The second record includes a third parameter and is associated with a second instruction to wait for a time period corresponding to the third parameter. The non-programmable ROM is configured to store a first routine and a second routine. A first routine defines a process to be executed by the processor according to the first instruction by using an identifier of a power supply corresponding to the first parameter and one state of the ON state and the OFF state corresponding to the second parameter as arguments. A second routine defines a process to be executed by the processor according to the second instruction as an argument. The processor is configured to sequentially read the parameter records included in the series of parameter records from a head of parameter records and to execute a routine corresponding to the read parameter records.

According to the present embodiment, it is possible to make changes to the order of booting and stopping the plurality of power supplies and a delay time by changing the series of parameter records stored in the program memory. Since there is no need to change the non-programmable ROM, the modification of a mask or the like may not be necessary and the design time or the time required for the design change can be shortened.

The sequence controller further includes a one time programmable (OTP)-ROM which is the programmable memory.

The sequence controller includes a random access memory (RAM) configured to store the series of parameter records loaded from the programmable memory.

The programmable memory may be an electrically erasable programmable read-only memory (EEPROM). The programmable memory may be a flash memory.

The programmable memory is externally attached to the sequence controller. The controller further includes an interface circuit with the programmable memory. The interface circuit may be an inter IC (I2C), or a serial peripheral interface.

The non-programmable ROM is configured to store a first set of the series of parameter records. The programmable memory is configured to store a second set of the series of parameter records. The processor is configured to selectively use one of the first set and the second set.

The sequence controller further includes a random access memory (RAM) to which the first set and the second set are selectively loadable. The processor is configured to read one of the first set and the second set loaded into the RAM.

The programmable memory is configured to store a plurality of series of parameter records corresponding to a plurality of transitions. The sequence controller further includes an event decoder configured to detect an event. The processor is configured to determine a transition by the event detected by the event decoder as a trigger, and to read a series of parameter records corresponding to the transition. The event includes a press of a power button, a press of a reset button, a press of a specific key on a keyboard, an input of system power, an input of a specific gesture to a touch panel or the like.

In the sequence controller, the plurality of power supplies is integrated.

According to another embodiment of the present disclosure, there is provided an electronic device. The electronic device includes the aforementioned sequence controller.

Combinations of the above elements or substitutions of the elements and expressions of the present disclosure among a method, an apparatus and a system are also effective as embodiments of the present disclosure.

DETAILED DESCRIPTION

Embodiments of the present disclosure will be now described in detail with reference to the drawings. Like or equivalent components, members, and processes illustrated in each drawing are given like reference numerals and a repeated description thereof will be properly omitted. Further, the embodiments are presented by way of example only, and are not intended to limit the present disclosure, and any feature or combination thereof described in the embodiments may not necessarily be essential to the present disclosure.

In the present disclosure, "a state where a member A is connected to a member B" includes a case where the member A and the member B are physically directly connected or even a case where the member A and the member B are indirectly connected through any other member that does not affect an electrical connection state between the members A and B.

Similarly, "a state where a member C is installed between a member A and a member B" includes a case where the member A and the member C or the member B and the member C are indirectly connected through any other member that does not affect an electrical connection state between the members A and C or the members B and C, in addition to a case where the member A and the member C or the member B and the member C are directly connected.

Figure 1:
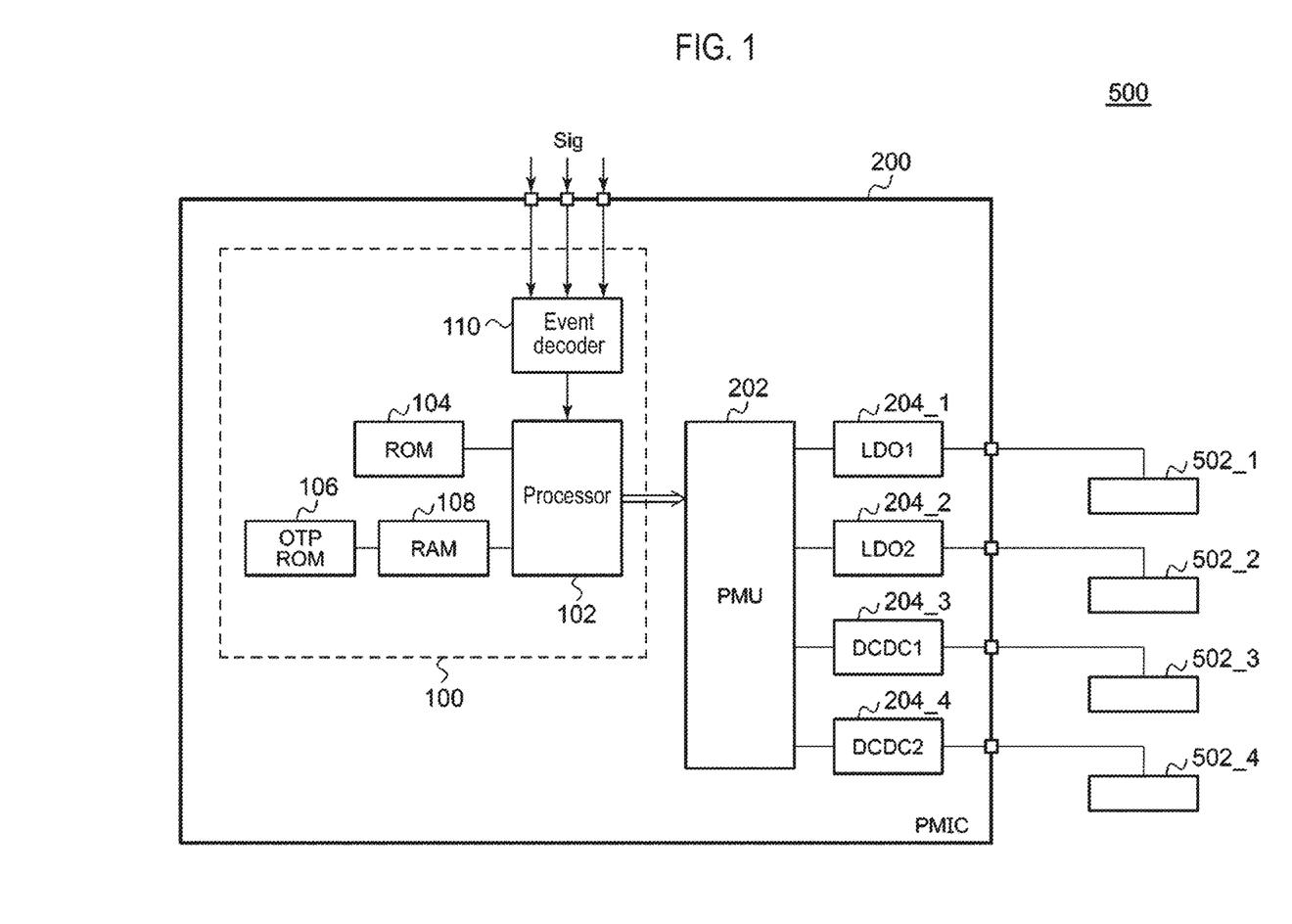
FIG. 1 is a block diagram of a power management integrated circuit (PMIC) 200 including a sequence controller according to a first embodiment of the present disclosure.

FIG. 1 is a block diagram of a power management integrated circuit (PMIC) 200 including a sequence controller 100 according to a first embodiment of the present disclosure. The PMIC 200 is mounted on an electronic device 500 having a plurality of load devices 502_1 to 502_4, and supplies appropriate power supply voltages $V_{DD1}$ to $V_{DD4}$ to the plurality of load devices 502_1 to 502_4. The type and the number of the load devices 502 are not particularly limited, but for example, a CPU, a random access memory (RAM), a hard disk (HDD), a solid state drive (SDD), an audio circuit, a display driver, or the like are exemplified.

In order to operate the plurality of load devices 502 normally, it is necessary to boot them in a predetermined order, and therefore, it is required to correctly control the sequence of turning on and off the power supply voltages for these components in the order of several μs. For example, the supply of power to the RAM must be completed before the CPU accesses the RAM.

In addition, the inside of recent CPUs is subdivided into dozens of circuit blocks and a power terminal is installed for each circuit block so that a power supply voltage can be independently supplied for each circuit block. Further, by turning on and off the power supply voltage for each power terminal according to an operation state of the CPU, power consumption can be reduced.

The PMIC 200 includes the sequence controller 100, a power management unit 202, and a plurality of power supplies 204_1 to 204_4, and is a functional IC integrated on a single semiconductor substrate.

In FIG. 1, the plurality of power supplies 204_1 to 204_4 correspond to the plurality of load devices 502. When the CPU has a plurality of power pins, the plurality of power supplies 204_1 to 204_4 may be installed at the plurality of power pins, respectively, in some cases. The plurality of power supplies 204_1 to 204_4 are configured such that ON and OFF are individually switchable. The plurality of power supplies 204_1 to 204_4 may be a DC/DC converter of a step-up type, a step-down type or a step-up/step-down type, or may be a low drop output (LDO), a charge pump circuit, or the like.

It is to be understood by those skilled in the art that some components constituting the plurality of power supplies 204_1 to 204_4, for example, inductors, transformers, smoothing capacitors, resistors for feedback, switching elements and the like, are constituted by chip components and discrete components, and are externally attached to the outside of the PMIC 200.

In this embodiment, power supplies of four systems are taken as an example, and identifiers LDO1, LDO2, DCDC1, and DCDC2 are labelled to the plurality of power supplies 204_1 to 204_4, respectively.

The sequence controller 100 is a sequencer configured to receive a plurality of control signals Sig from a main power button and a reset button of the CPU and the electronic device 500 and to control the start and stop of the plurality of power supplies 204_1 to 204_4 in a sequence that satisfies the required specifications based on the control signals Sig. The control signals Sig may include an interrupt request (IRQ).

The power management unit 202 is an interface of the sequence controller 100 and the plurality of power supplies 204_1 to 204_4, and controls ON/OFF of each of the plurality of power supplies 204_1 to 204_4 based on an output of the sequence controller 100.

The sequence controller 100 includes a processor 102, a non-programmable ROM 104, a programmable memory 106, a RAM 108, and an event decoder 110.

The processor 102 enables a software program to be executable, and is also referred to as a central processing unit (CPU) or a microcontroller.

A sequence to be executed by the sequence controller 100 is described as a series of parameter records, and the series of parameter records are stored in the programmable memory 106. In the present embodiment, the programmable memory 106 is a one time programmable (OTP)-ROM. The series of parameter records stored in the programmable memory 106 are loaded into the RAM 108 when the PMIC 200 is booted.

Each parameter record PRM_REC included in the series of parameter records is either a first record associated with a first instruction or a second record associated with a second instruction.

(i) First Instruction

The first instruction is a Set instruction, and is designated by a first record. The first record includes a first parameter PRM1 and a second parameter PRM2. The first parameter PRM1 designates one of the plurality of power supplies 204_1 to 204_4 as a target of the corresponding instruction.

The second parameter PRM2 takes either ON or OFF, and designates whether the target power supply should be set to an ON state or an OFF state.

(ii) Second Instruction

The second instruction is a Wait instruction, and is designated by a second record. The second record includes a third parameter PRM3. The third parameter PRM3 designates a wait time in the Wait instruction.

For ease of understanding and simplification of description, the first record PRM_REC corresponding to the Set instruction is expressed as follows.

Set PRM1, PRM2

A first argument PRM1 is an identifier for designating a power supply to be controlled. In the present embodiment, this identifier PRM1 can take a value corresponding to one of LDO1, LDO2, DCDC1, and DCDC2.

A second argument PRM2 is a parameter for designating whether to turn on or off a power supply to be controlled, and can take a value corresponding to either ON or OFF.

Similarly, the second record PRM_REC corresponding to the Wait instruction is expressed as follows.

Wait PRM3

An argument PRM3 is a parameter indicating a delay time (wait time).

The non-programmable ROM 104 stores (i) a first routine (set routine) that defines a process to be executed by the processor 102 according to the first instruction by using an identifier of the power supply corresponding to the first parameter PRM1 and one state of the ON state and the OFF state corresponding to the second parameter as arguments, and (ii) a second routine (wait routine) that defines a process to be executed by the processor according to the second instruction by using a time corresponding to the third parameter PRM3 as an argument.

The entities of the first routine and the second routine are binary codes, which may be generated by writing a program in a programming language such as C and compiling the same using an external computer. These binary codes are written into the non-programmable ROM 104.

The processor 102 reads the parameter records PRM_REC included in the series of parameter records loaded into the RAM 108 in order from the head parameter record, and executes the routine corresponding to the read parameter records PRM_REC.

The configuration of the PMIC 200 has been described above. Next, an operation thereof will be described.

Figure 2:
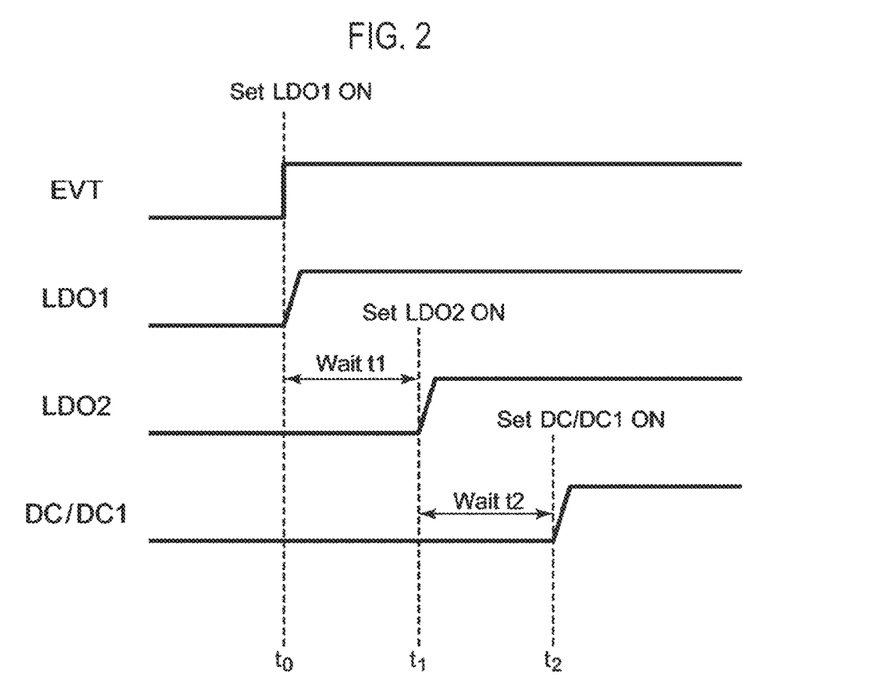
FIG. 2 is a diagram illustrating an example of a sequence.

FIG. 2 is a diagram illustrating an example of a sequence. When the occurrence of a predetermined event EVT is detected by the event decoder 110, its corresponding sequence is triggered.

In this sequence, the power supply 204_1 is turned on at time $t_0$, the power supply 204_2 is turned on at time $t_1$ after the lapse of delay time $t_1$ from the time $t_0$, and the power supply 204_3 is turned on at time $t_2$ after the lapse of delay time $t_2$ from the time $t_1$.

A series of parameter records corresponding to the sequence of FIG. 2 are expressed as follows using the Set instruction and the Wait instruction.

Set LDO1 ON
Wait t1
Set LDO2 ON
Wait t2
Set DCDC1 ON

Figure 3A:
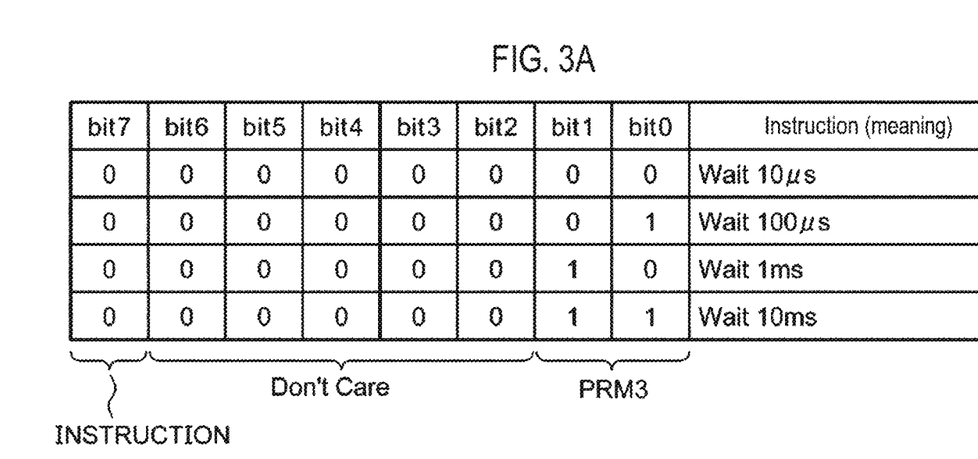
FIGS. 3A and 3B are tables illustrating an example of parameter records PRM_REC corresponding to a Wait instruction and a Set instruction.
Figure 3B:
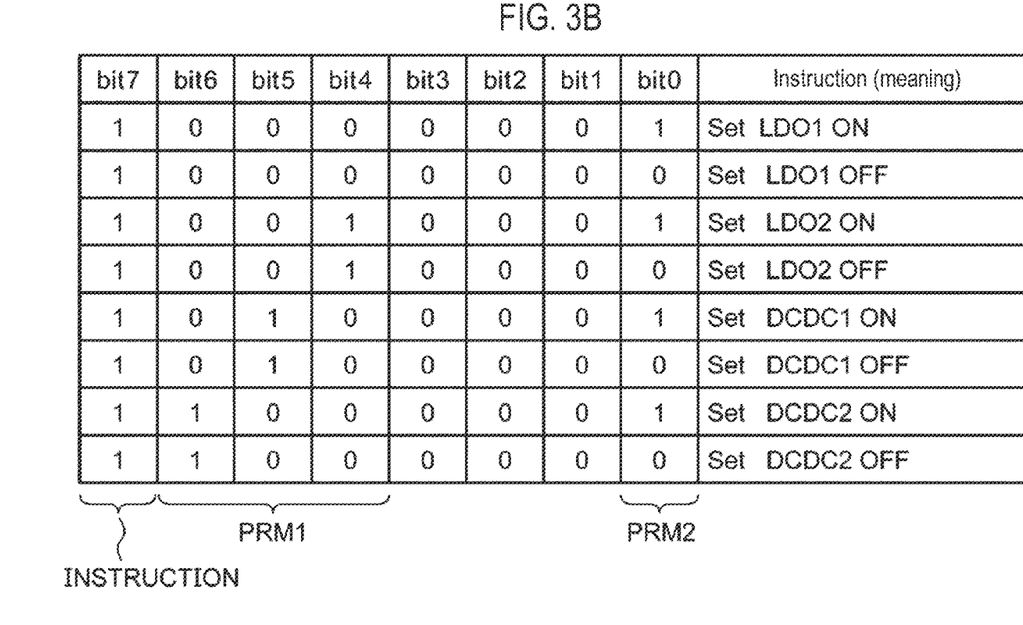

FIGS. 3A and 3B are tables illustrating examples of the parameter records PRM_REC corresponding to the Wait instruction and the Set instruction. Each of the parameter records PRM_REC is defined by one word of 8 bits. The most significant bit (bit7) indicates the type of instruction, and in this example, the value "0" indicates the Wait instruction and the value "1" indicates the Set instruction.

FIG. 3A illustrates a record associated with the Wait instruction. The lower 2 bits (bit1, bit0) of this record correspond to PRM3 and indicate a wait time. Specifically, the value "00" corresponds to 10 μs (micro second), the value "01" corresponds to 100 μs, the value "10" corresponds to 1 ms, and the value "11" corresponds to 10 ms. The values of bit6 to bit2 are meaningless, which is a so-called Don't Care.

FIG. 3B illustrates a record associated with the Set instruction, and the most significant bit (bit7) of this record has the value "1". Regarding the Set instruction, in this example, the least significant bit (bit0) corresponds to PRM2, and the value "1" corresponds to ON and the value "0" corresponds to OFF. Further, the remaining bits (bit6-bit1) may be assigned to PRM1. In this example, bit6 to bit4 are assigned to PRM1, in which the value "000" corresponds to LDO1, the value "001" corresponds to LDO2, the value "010" corresponds to DCDC 1, and the value "100" corresponds to DCDC2. The values of bit3 to bit1 are meaningless, which is a so-called Don't Care.

Figure 4A:
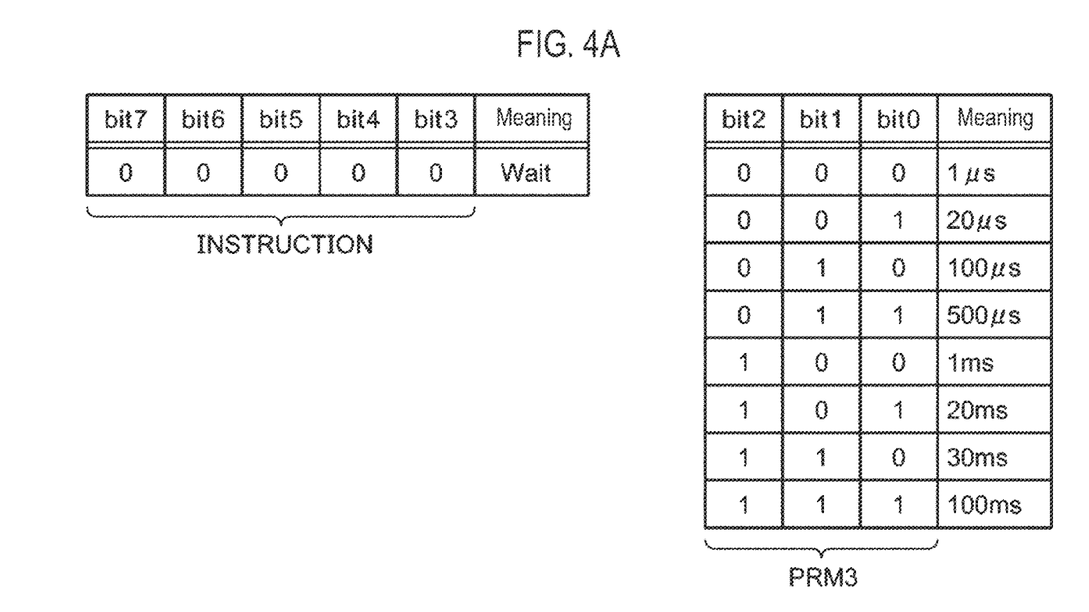
FIGS. 4A and 4B are tables illustrating another example of the parameter records PRM_REC corresponding to the Wait instruction and the Set instruction.
Figure 4B:
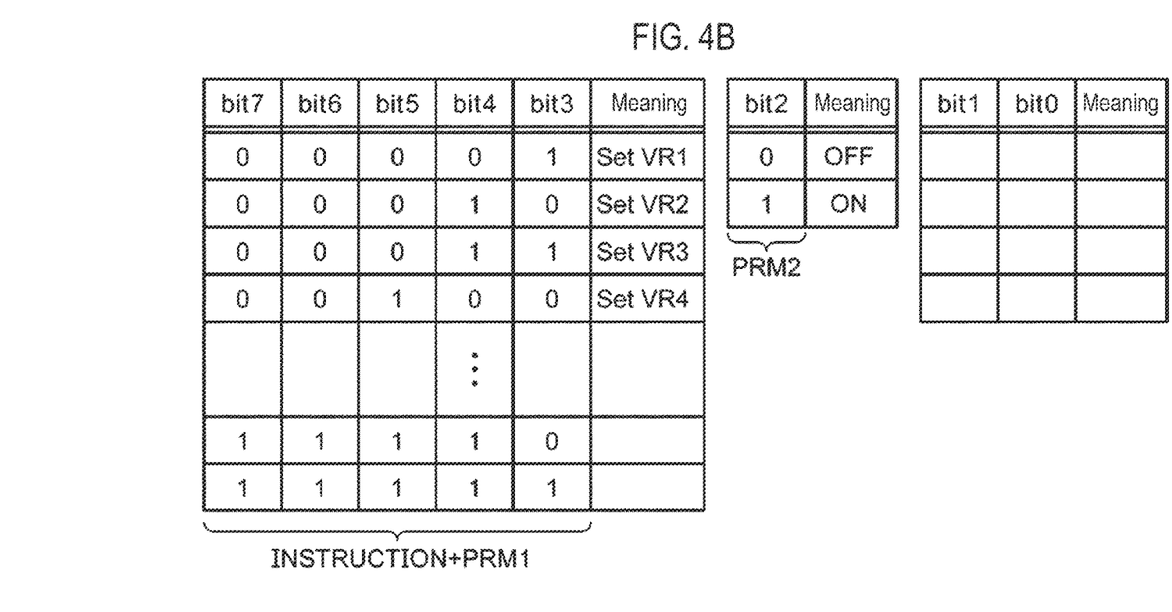

FIGS. 4A and 4B are tables illustrating another example of parameter records PRM_REC corresponding to the Wait instruction and the Set instruction. In the Wait instruction of FIG. 4A, the lower 3 bits (bit2-bit0) are assigned to the third parameter PRM3, and the wait time can be designated with 8 values. Further, the upper 5 bits (bit7-bit3)=[00000] indicates the Wait instruction.

In the Set instruction of FIG. 4B, the sixth upper bit (bit2) is assigned to the second parameter PRM2, in which the value "0" corresponds to OFF and the value "1" corresponds to ON. Further, the 5 upper bits (bit7-bit3) other than [00000] indicate that they are the Set instruction and also indicate the first parameter PRM1. VR1, VR2 . . . indicates things that generalize identifiers of the power supplies to be controlled, which in this example can specify a maximum of 31 power supplies.

The lower 2 bits (bit1, bit0) are Don't Care (redundant), but they may have any meaning. For example, a wait function may be added to the Set instruction, and the lower 2 bits may be used as a fourth parameter PRM4 indicating the wait time after executing the Set instruction. If PRM4= [00] is defined by zero delay, it may be used as a normal Set instruction, and when they have a value "01", "10", or "11", the wait process of 10 s, 1 ms, or 10 ms may be performed.

In addition, the parameter records in FIGS. 3A-3B and FIGS. 4A-4B are merely examples, and it should be understood by those skilled in the art that there may be various modifications. For example, the number of bits to be assigned to each parameter and the position of bits may be freely changeable. Also, the assignment of the value of each parameter and its meaning may be changeable.

Figure 5:
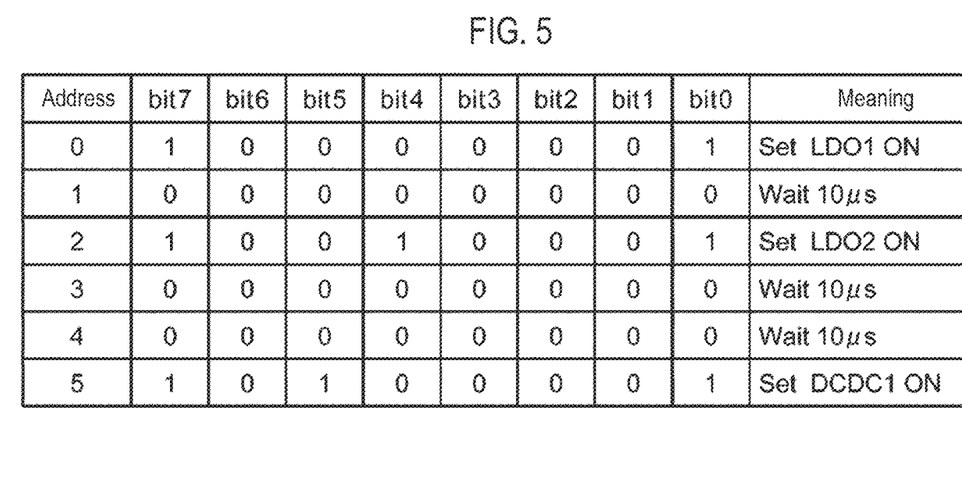
FIG. 5 is a diagram illustrating an example of a series of parameter records stored in a programmable memory.

FIG. 5 is a diagram illustrating an example of a series of parameter records stored in the programmable memory 106. The sequence is configured with six steps, and therefore, the series of parameter records include six parameter records PRM_REC and are stored at predetermined addresses (here, 0-5) of the programmable memory 106.

A waiting period of 20 s can be achieved by continuing the Wait instruction of 10 μs at the addresses 3 and 4, so that DCDC1 can be turned on after the lapse of 20 μs from turning on LDO2.

Figure 6:
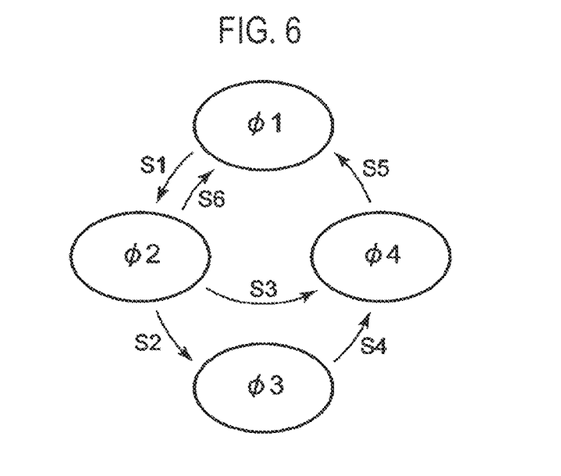
FIG. 6 is a state transition diagram of a sequence controller.

FIG. 6 is a state transition diagram of the sequence controller 100. The sequence controller 100 may have multiple states. The states may be recognized as a combination of ON and OFF states of the plurality of power supplies. Then, in a certain state, when a predetermined event occurs, the state transits to another predetermined state. The above sequence is defined for each transition, and the corresponding sequence is executed in response to the occurrence of the event as a trigger. In FIG. 6, when it is assumed that four states Φ1 to Φ4 can be simply obtained, six transitions S1 to S6 exist. Each of the states Φ1 to Φ4 can correspond to one of an OFF state, a READY state, a RUN state, an IDLE state, a SUSPEND state, and any other state.

The correspondence relationship among the current state, the triggering event and the transition is stored in the non-programmable ROM 104 as a lookup table.

Figure 7:
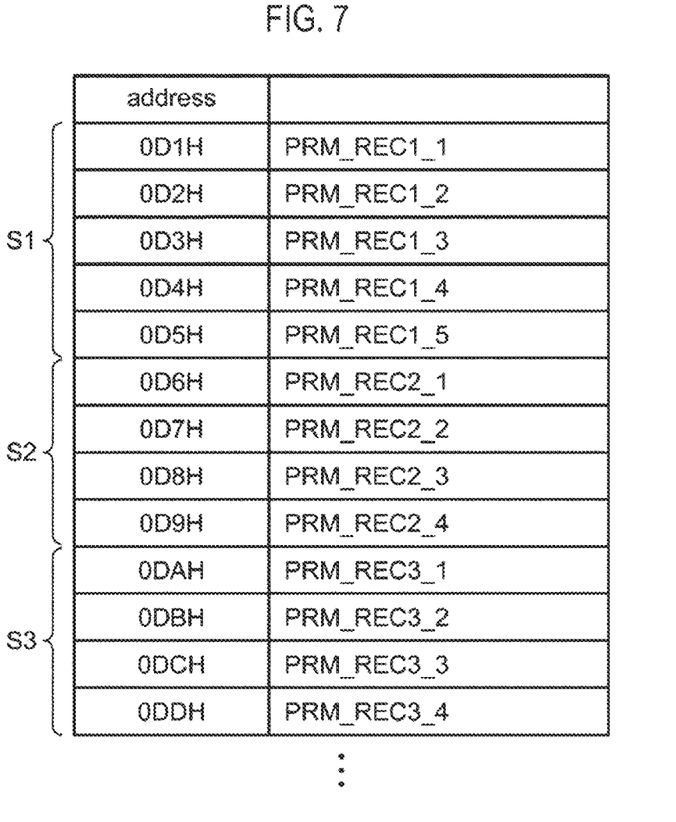
FIG. 7 is a diagram illustrating an example of address assignment of parameter records on a RAM.

The series of parameter records are defined for each transition. FIG. 7 is a diagram illustrating an example of address assignment of parameter records on the RAM. The series of parameter records stored in the programmable memory 106 are loaded into predetermined address areas of the RAM. The parameter records are stored collectively for each transition. A transition S1 includes five steps, and a series of parameter records PRM_REC1-1 to PRM_REC1-5 of five words, which corresponds to the transition S1, are stored at addresses 0D1H to 0D5H. A subsequent transition S2 includes four steps, and a series of parameter records PRM_REC2-1 to PRM_REC2-4 of 4 words, which corresponds to the transition S2, are stored at addresses 0D6H to 0D9H. A transition S3 includes four steps, and a series of parameter records PRM_REC3-1 to PRM_REC3-4 of 4 words, which corresponds to the transition S3, are stored at subsequent addresses 0DAH to 0DDH. Similarly, thereafter, a series of parameter records associated with transitions S4 and S5 are stored.

Figure 8:
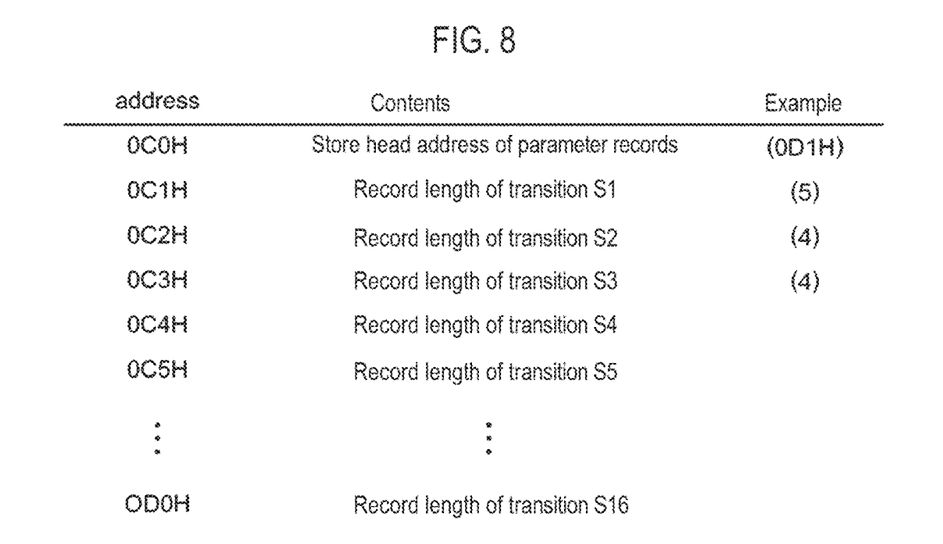
FIG. 8 is a diagram illustrating an example of address assignment on a RAM.

FIG. 8 is a diagram illustrating an example of address assignments on the RAM. An address (0D1H in FIG. 7) at which the head parameter record PRM_REC is stored is stored at a predetermined address 0C0H. Further, a record length (the value "5" in this example) of the transition S1 is stored at a predetermined address 0C1H, a record length of the transition S2 (the value "4" in this example) is stored at a predetermined address 0C2H, and a record length of the transition S3 (the value "4" in this example) is stored at a predetermined address 0C3H. Record lengths of the transitions S4 and S5 are stored at addresses 0C4H and 0C5H.

When a predetermined event occurs in a certain state, the processor 102 determines its corresponding transition. For example, when the transition S3 occurs, the processor 102 calculates addresses at which a series of corresponding parameter records PRM_REC3-1 to PRM_REC3-4 is stored, by referring to the addresses in FIG. 8.

Specifically, the head address value (0D1H) is acquired by accessing the address 0C0H, and the values (5, 4) of the record lengths of the transitions S1 and S2 are acquired from the addresses 0C1H and 0C2H. Then, it is calculated that 0D1H+5+4=0DAH to obtain the head address of the series of parameter records PRM_REC3-1 to PRM_REC3-4 corresponding to the transition S3. Further, from the head address, the parameter records PRM_REC are read by the number of words indicated by the value (4) of the address 0C3H.

The sequence controller 100 according to the first embodiment has been described above. According to the sequence controller 100, it is possible to make changes in the order of booting and stopping the plurality of power supplies and the delay time by changing the series of parameter records PRM_PRM stored in the programmable memory 106. Since there is no need to change the non-programmable ROM 104, the modification of the mask or the like may not be necessary and the design time and the time required for the design change may be shortened.

Second Embodiment

Figure 9:
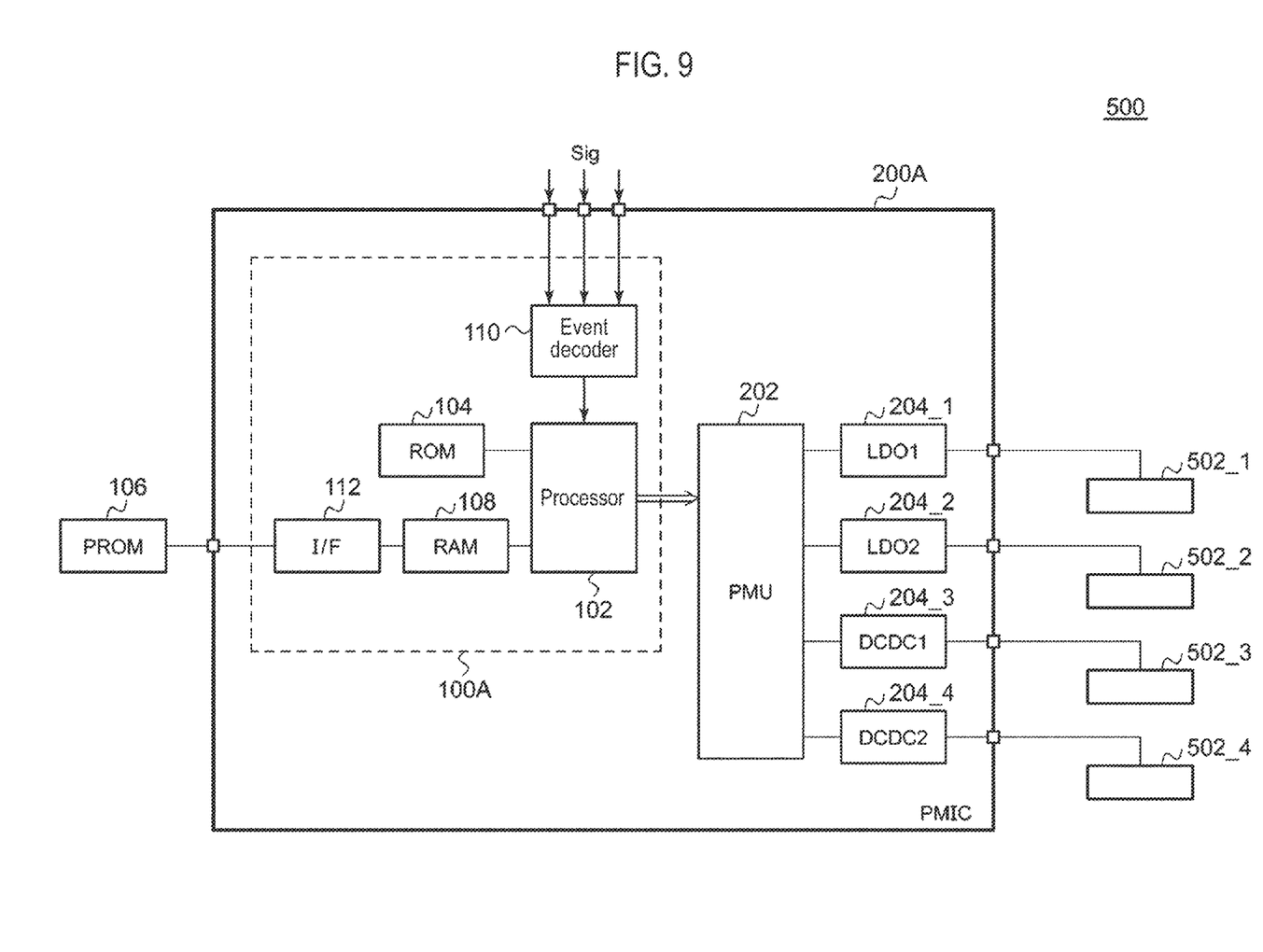
FIG. 9 is a block diagram of a power management integrated circuit including a sequence controller according to a second embodiment of the present disclosure.

FIG. 9 is a block diagram of a power management integrated circuit 200A including a sequence controller 100A according to a second embodiment of the present disclosure. In the second embodiment, the programmable memory 106 is externally attached to the PMIC 200A. As the programmable memory 106, an EEPROM or a flash memory may be used.

The sequence controller 100A includes an interface circuit 112 with the external programmable memory 106. As the interface circuit 112, an inter IC ($I^2C$) interface, a serial peripheral interface (SPI), or the like may be employed.

The series of parameter records RPM_REC stored in the programmable memory 106 are loaded into a predetermined address area of the RAM 108 when the PMIC 200A is booted.

The present disclosure has been described above with reference to the embodiments. It should be understood by those skilled in the art that the embodiments are merely illustrative and may be differently modified by any combination of the components or processes, and the modifications are also within the scope of the present disclosure. Hereinafter, these modifications will be described.

(First Modification)

In the first and second embodiments, there has been described a case where a series of parameter records are stored only in the programmable memory 106, but the present disclosure may not be limited thereto. In a first modification, the programmable memory 106 stores a first set of series of parameter records and the non-programmable ROM 104 stores a second set of series of parameter records. Further, the processor 102 is configured to selectively use the first set and the second set.

For example, the second set stored in the non-programmable ROM 104 may define a default sequence defined at the initial design stage. At the beginning of the design of the PMIC 200, the first set of parameter records is not stored in the programmable memory 106, and the default sequence is executed based on the second set.

When it is necessary to change the sequence, the first set describing a new sequence is written in the programmable memory 106. If there is the second set, the processor 102 can perform a sequence control based thereon.

(Second Modification)

In the first and second embodiments, the first record corresponding to the first instruction and the second record corresponding to the second instruction have been prepared as the parameter records, but the present disclosure may not be limited thereto. In addition, an additional instruction may be defined, and a third record and a fourth record associated with the additional instructions may be used.

(Third Modification)

In the first and second embodiments, the data stored in the programmable memory 106 have been temporarily loaded into a predetermined address area of the RAM 108, but the present disclosure is not limited thereto. In the case of using an EEPROM or a flash memory as the programmable memory 106, since high-speed access is possible, the processor 102 may directly access the series of parameter records stored in the programmable memory 106. In this case, the address of the RAM may be read as the address of the programmable memory 106 based on the description of FIGS. 7 and 8.

(Fourth Modification)

In the first and second embodiments, aspects of the sequence controller have been described in which the sequence controller 100 is integrated together with the power management unit 202 and the plurality of power supplies 204_1 to 204_4. However, the present disclosure may not be limited thereto and only a part of the sequence controller 100 may be provided with an independent IC.

According to the present disclosure in some embodiments, it is possible to flexibly deal with various required specifications.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A sequence controller for controlling a sequence of booting and stopping a plurality of power supplies, comprising:
   a processor; and
   a non-programmable read only memory (ROM) configured to store information relating to a plurality of transitions between a plurality of states to boot and stop the plurality of power supplies, the plurality of transitions being triggered based on a plurality of predetermined events, respectively;
   a programmable memory configured to store a plurality of parameter records describing the sequence, each of plural series of parameter records among the plurality of parameter records being defined for one of the plurality of transitions; and
   an event decoder configured to detect an event among the plurality of predetermined events,
   wherein each of the plurality of parameter records is one of (i) a first record including a first parameter and a second parameter and associated with a first instruction for setting one of the plurality of power supplies corresponding to the first parameter to one state of an ON state and an OFF state corresponding to the second parameter and (ii) a second record including a third parameter and associated with a second instruction to wait for a time period corresponding to the third parameter,
   wherein the processor is configured to:
   read a series of parameter records, which corresponds to the event detected by the event decoder, among the plural series of parameter records; and
   execute a routine according to the read series of parameter records to execute a transition, which corresponds to the event detected by the event decoder, among the plurality of transitions.

2. The sequence controller of claim 1, further comprising a one time programmable (OTP)-ROM which is the programmable memory.

3. The sequence controller of claim 2, further comprising a random access memory (RAM) configured to store the series of parameter records loaded from the programmable memory.

4. The sequence controller of claim 1, wherein the programmable memory is an electrically erasable programmable read-only memory (EEPROM).

5. The sequence controller of claim 1, wherein the programmable memory is a flash memory.

6. The sequence controller of claim 1, wherein the programmable memory is externally attached to the sequence controller, and
   wherein the sequence controller further comprises an interface circuit with the programmable memory.

7. The sequence controller of claim 1, wherein the non-programmable ROM is configured to store an additional series of parameter records,
   and
   wherein the processor is configured to selectively use one of the plural series of parameter records stored in the programmable memory and the series of parameter records stored in the non-programmable ROM.

8. The sequence controller of claim 7, further comprising a random access memory (RAM) to which the plural series of parameter records stored in the programmable memory and the series of parameter records stored in the non-programmable ROM set are selectively loadable,
   wherein the processor is configured to read into the RAM one of the plural series of parameter records stored in the programmable memory and the series of parameter records stored in the non-programmable ROM.

9. The sequence controller of claim 1, wherein the plurality of power supplies is integrated.

10. An electronic device comprising a sequence controller for controlling a sequence of booting and stopping a plurality of power supplies, comprising:
    a processor; and
    a non-programmable read only memory (ROM) configured to store information relating to a plurality of transitions between a plurality of states to boot and stop the plurality of power supplies, the plurality of transitions being triggered based on a plurality of predetermined events, respectively;
    a programmable memory configured to store a plurality of parameter records describing the sequence, each of plural series of parameter records among the plurality of parameter records being defined for one of the plurality of transitions; and
    an event decoder configured to detect an event among the plurality of predetermined events, wherein each of the plurality of parameter records is one of (i) a first record including a first parameter and a second parameter and associated with a first instruction for setting one of the plurality of power supplies corresponding to the first parameter to one state of an ON state and an OFF state corresponding to the second parameter and (ii) a second record including a third parameter and associated with a second instruction to wait for a time period corresponding to the third parameter, and wherein the processor is configured to:
   read a series of parameter records, which corresponds to the event detected by the event decoder, among the plural series of parameter records; and
   execute a routine according to the read series of parameter records to execute a transition, which corresponds to the event detected by the event decoder, among the plurality of transitions.

\* \* \* \* \*